United States Patent
Karar et al.

(10) Patent No.: US 9,553,675 B2
(45) Date of Patent: Jan. 24, 2017

(54) FREQUENCY DOMAIN CODED MODULATION WITH POLARIZATION INTERLEAVING FOR FIBER NONLINEARITY MITIGATION IN DIGITAL SUB-CARRIER COHERENT OPTICAL COMMUNICATION SYSTEMS

(71) Applicant: Infinera Corporation, Sunnyvale, CA (US)

(72) Inventors: Abdullah S. Karar, Kingston (CA); Han Sun, Ottawa (CA); Ahmad Awadalla, Gatineau (CA); Kuang-Tsan Wu, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/754,521

(22) Filed: Jun. 29, 2015

(65) Prior Publication Data
US 2016/0261347 A1    Sep. 8, 2016

Related U.S. Application Data

(60) Provisional application No. 62/127,647, filed on Mar. 3, 2015, provisional application No. 62/154,151, filed on Apr. 29, 2015.

(51) Int. Cl.
H04B 10/00 (2013.01)
H04B 10/532 (2013.01)
H04B 10/61 (2013.01)

(52) U.S. Cl.
CPC ........ H04B 10/532 (2013.01); H04B 10/6162 (2013.01)

(58) Field of Classification Search
CPC ........................ H04B 10/532; H04B 10/6162
(Continued)

(56) References Cited

U.S. PATENT DOCUMENTS 8,073,338 B2 * 12/2011 Buelow ................ H04B 10/505
                                                            398/184
8,498,542 B2 *  7/2013 Frankel .............. H04B 10/5053
                                                            398/184
(Continued)

FOREIGN PATENT DOCUMENTS

EP         2066044 A1      6/2009

OTHER PUBLICATIONS

Borne et al., "Polarization interleaving to reduce inter-channel nonlinear penalties in polarization multiplexed transmission," http://w3.tue.nl/fileadmin/ele/TTE/ECO/Files/Pubs_2005/Borne_polarization_OFC05_JWA41.pdf, 2004, 3 pages.
(Continued)

Primary Examiner — M. R. Sedighian
(74) Attorney, Agent, or Firm — David L. Soltz

(57) ABSTRACT

An optical transmitter may receive and encode a first group of bits into first encoded data and second encoded data. The optical transmitter may supply a first sub-carrier carrying a first symbol and a second sub-carrier carrying a second symbol. The first symbol and the second symbol may be based on the first encoded data and the second encoded data, respectively, such that the first sub-carrier has a first polarization state comprising first and second polarization components, and the second sub-carrier has a second polarization state comprising first and second polarization components. The first polarization state may be substantially orthogonal to the second polarization state. An optical receiver may receive the first symbol via the first sub-carrier, may receive the second symbol via the second sub-carrier, may decode the first symbol and the second symbol into a second group of bits, and may output the second group of bits.

20 Claims, 11 Drawing Sheets

(58) Field of Classification Search
USPC .......................................................... 398/152
See application file for complete search history.

(56) References Cited

U.S. PATENT DOCUMENTS

| | | | | |
|---|---|---|---|---|
| 8,693,459 | B2* | 4/2014 | Youn | H04B 10/532 370/350 |
| 8,861,636 | B2 | 10/2014 | Sun et al. | |
| 9,143,238 | B2* | 9/2015 | Roberts | H04B 10/532 |
| 2015/0030333 | A1 | 1/2015 | Sun et al. | |
| 2016/0197681 | A1* | 7/2016 | Sun | H04B 10/6161 398/81 |

OTHER PUBLICATIONS

Shiner et al., "Demonstration of an 8-dimensional modulation format with reduced inter-channel nonlinearities in a polarization multiplexed coherent system," http://arxiv.org/ftp/arxiv/papers/1406/1406.1460.pdf, Jun. 5, 2014, 9 pages.

U.S. Appl. No. 14/231,418, filed Mar. 2014, Sun et al.
U.S. Appl. No. 14/231,357, filed Mar. 2014, Sun et al.
Millar et al., "High-dimensional modulation for coherent optical communications systems," https://www.osapublishing.org/oe/abstract.cfm?uri=oe-22-7-8798, Apr. 4, 2014, 15 pages.
Shiner et al., "Demonstration of an 8D Modulation Format with Reduced Inter-Channel Nonlinearities in a Polarization Multiplexed Coherent System," http://arxiv.org/ftp/arxiv/papers/1406/1406.1460.pdf, Jun. 5, 2014, 7 pages.
Yaman et al., "Nonlinear Impairment Compensation for Polarization-Division Multiplexed WDM Transmission Using Digital Backward Propagation," http://www.creol.ucf.edu/Research/Publications/2535.pdf, Aug. 2009, 10 pages.
Borne et al., "Polarization interleaving to reduce inter-channel nonlinear penalties in polarization multiplexed transmission," http://w3.tue.nl/fileadmin/ele/TTE/ECO/Files/Pubs_2005/Borne_polarization_OFC05_JWA41.pdf, Mar. 11, 2005, 3 pages.
Marcuse et al., "Application of the Manakov-PMD Equation to Studies of Signal Propagation in Optical Fibers with Randomly Varying Birefringence," http://photonics.umbc.edu/publications/PdfPapers/PAJ108.pdf, Sep. 1997, 12 pages.

* cited by examiner

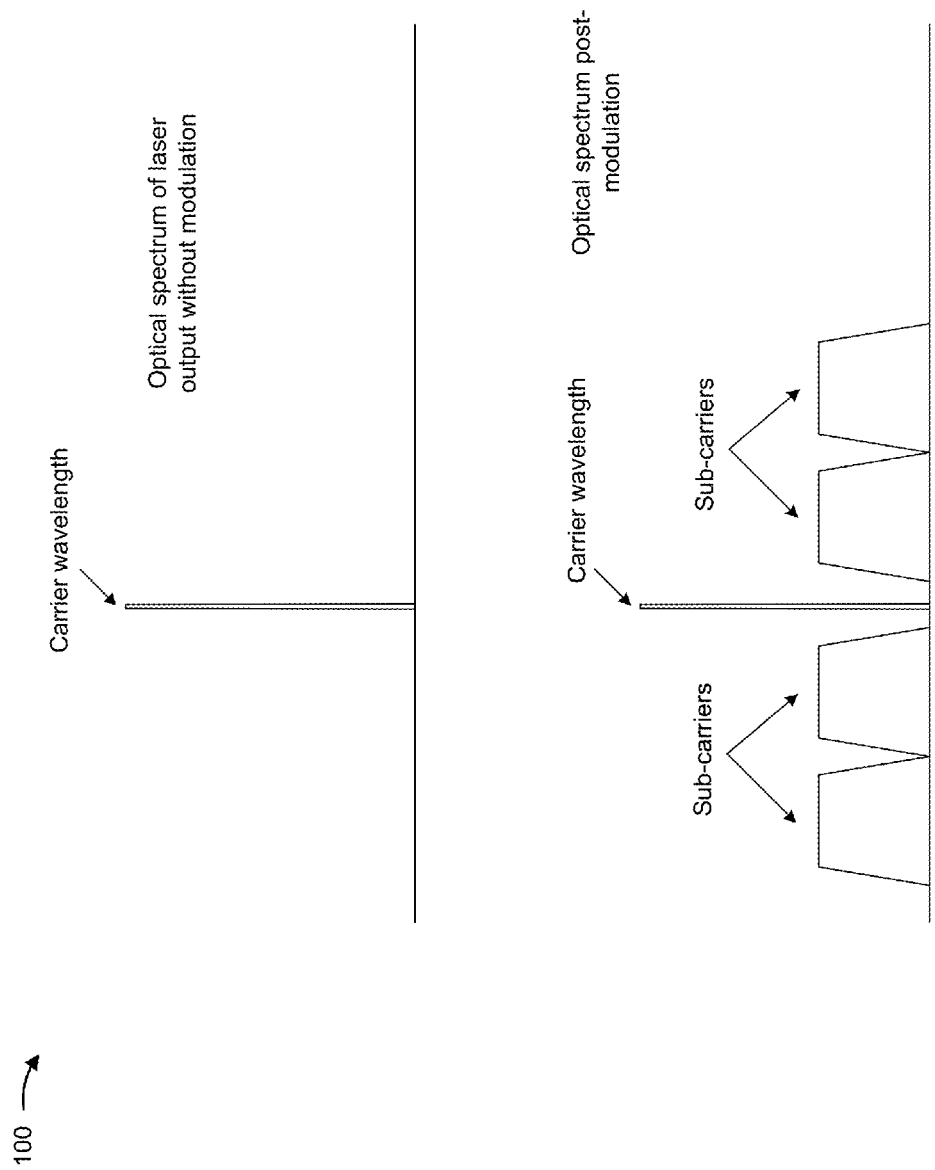

| | XI[0] | XQ[0] | YI[0] | YQ[0] | XI[1] | XQ[1] | YI[1] | YQ[1] | J[0],J[1] |
|---|---|---|---|---|---|---|---|---|---|
| CW0 | -1 | -1 | 1 | -1 | -1 | -1 | -1 | 1 | 0 |
| CW1 | -1 | 1 | 1 | 1 | -1 | 1 | -1 | -1 | 0 |
| CW2 | -1 | 1 | -1 | 1 | -1 | -1 | -1 | -1 | 0 |
| CW3 | -1 | 1 | 1 | 1 | 1 | 1 | 1 | 1 | 0 |
| CW4 | 1 | -1 | -1 | 1 | 1 | 1 | -1 | 1 | 0 |
| CW5 | -1 | -1 | 1 | -1 | -1 | -1 | -1 | -1 | 0 |
| CW6 | 1 | 1 | 1 | 1 | 1 | 1 | -1 | -1 | 0 |
| CW7 | 1 | 1 | -1 | 1 | -1 | -1 | 1 | -1 | 0 |
| CW8 | -1 | -1 | 1 | -1 | 1 | 1 | 1 | 1 | 0 |
| CW9 | -1 | 1 | 1 | -1 | 1 | 1 | 1 | 1 | 0 |
| CW10 | 1 | -1 | -1 | -1 | -1 | 1 | -1 | 1 | 0 |
| CW11 | 1 | 1 | 1 | -1 | 1 | 1 | 1 | 1 | 0 |
| CW12 | 1 | -1 | -1 | 1 | -1 | 1 | 1 | 1 | 0 |
| CW13 | 1 | -1 | 1 | -1 | 1 | 1 | -1 | 1 | 0 |
| CW14 | 1 | -1 | 1 | 1 | 1 | 1 | 1 | 1 | 0 |
| CW15 | 1 | 1 | -1 | 1 | 1 | 1 | 1 | -1 | 0 |

FIG. 7

|  | XI[0] | XQ[0] | YI[0] | YQ[0] | XI[1] | XQ[1] | YI[1] | YQ[1] | J[0]' J[1] |
|---|---|---|---|---|---|---|---|---|---|
| CW0 | 1 | -1 | 1 | 1 | -1 | -1 | -1 | 1 | 0 |
| CW1 | 1 | -1 | 1 | 1 | 1 | 1 | 1 | -1 | 0 |
| CW2 | 1 | -1 | 1 | -1 | -1 | 1 | 1 | -1 | 0 |
| CW3 | 1 | -1 | 1 | -1 | 1 | -1 | -1 | 1 | 0 |
| CW4 | 1 | -1 | -1 | 1 | -1 | 1 | -1 | 1 | 0 |
| CW5 | 1 | -1 | -1 | 1 | 1 | -1 | 1 | -1 | 0 |
| CW6 | 1 | -1 | -1 | -1 | -1 | -1 | 1 | -1 | 0 |
| CW7 | 1 | -1 | -1 | -1 | 1 | 1 | -1 | 1 | 0 |
| CW8 | 1 | 1 | 1 | 1 | -1 | -1 | 1 | 1 | 0 |
| CW9 | 1 | 1 | 1 | 1 | 1 | 1 | -1 | -1 | 0 |
| CW10 | 1 | 1 | 1 | -1 | -1 | 1 | -1 | -1 | 0 |
| CW11 | 1 | 1 | 1 | -1 | 1 | -1 | 1 | 1 | 0 |
| CW12 | 1 | 1 | -1 | 1 | -1 | 1 | 1 | 1 | 0 |
| CW13 | 1 | 1 | -1 | 1 | 1 | -1 | -1 | -1 | 0 |
| CW14 | 1 | 1 | -1 | -1 | -1 | -1 | -1 | -1 | 0 |
| CW15 | 1 | 1 | -1 | -1 | 1 | 1 | 1 | 1 | 0 |
| CW16 | -1 | -1 | 1 | 1 | -1 | -1 | -1 | -1 | 0 |
| CW17 | -1 | -1 | 1 | 1 | 1 | 1 | 1 | 1 | 0 |
| CW18 | -1 | -1 | 1 | -1 | -1 | 1 | 1 | 1 | 0 |
| CW19 | -1 | -1 | 1 | -1 | 1 | -1 | -1 | -1 | 0 |
| CW20 | -1 | -1 | -1 | 1 | -1 | 1 | -1 | -1 | 0 |
| CW21 | -1 | -1 | -1 | 1 | 1 | -1 | 1 | 1 | 0 |
| CW22 | -1 | -1 | -1 | -1 | -1 | -1 | 1 | 1 | 0 |
| CW23 | -1 | -1 | -1 | -1 | 1 | 1 | -1 | -1 | 0 |
| CW24 | -1 | 1 | 1 | 1 | -1 | -1 | 1 | -1 | 0 |
| CW25 | -1 | 1 | 1 | 1 | 1 | 1 | -1 | 1 | 0 |
| CW26 | -1 | 1 | 1 | -1 | -1 | 1 | -1 | 1 | 0 |
| CW27 | -1 | 1 | 1 | -1 | 1 | -1 | 1 | -1 | 0 |
| CW28 | -1 | 1 | -1 | 1 | -1 | 1 | 1 | -1 | 0 |
| CW29 | -1 | 1 | -1 | 1 | 1 | -1 | -1 | 1 | 0 |
| CW30 | -1 | 1 | -1 | -1 | -1 | -1 | -1 | 1 | 0 |
| CW31 | -1 | 1 | -1 | -1 | 1 | 1 | 1 | -1 | 0 |

| | XI[0] | XQ[0] | YI[0] | YQ[0] | XI[1] | XQ[1] | YI[1] | YQ[1] | J[0]' J[1] |
|---|---|---|---|---|---|---|---|---|---|
| CW0 | 1 | 1 | -1 | -1 | -1 | -1 | -1 | -1 | 0 |
| CW1 | -1 | 1 | 1 | -1 | -1 | -1 | -1 | -1 | 0 |
| CW2 | 1 | -1 | -1 | 1 | -1 | -1 | -1 | -1 | 0 |
| CW3 | -1 | -1 | 1 | 1 | -1 | -1 | -1 | -1 | 0 |
| CW4 | -1 | 1 | -1 | -1 | 1 | -1 | -1 | -1 | 0 |
| CW5 | -1 | -1 | 1 | -1 | 1 | -1 | -1 | -1 | 0 |
| CW6 | 1 | 1 | -1 | 1 | 1 | -1 | -1 | -1 | 0 |
| CW7 | 1 | -1 | 1 | 1 | 1 | -1 | -1 | -1 | 0 |
| CW8 | 1 | -1 | -1 | -1 | -1 | 1 | -1 | -1 | 0 |
| CW9 | 1 | 1 | 1 | -1 | -1 | 1 | -1 | -1 | 0 |
| CW10 | -1 | -1 | -1 | 1 | -1 | 1 | -1 | -1 | 0 |
| CW11 | -1 | 1 | 1 | 1 | -1 | 1 | -1 | -1 | 0 |
| CW12 | -1 | -1 | -1 | -1 | 1 | 1 | -1 | -1 | 0 |
| CW13 | 1 | -1 | 1 | -1 | 1 | 1 | -1 | -1 | 0 |
| CW14 | -1 | 1 | -1 | 1 | 1 | 1 | -1 | -1 | 0 |
| CW15 | 1 | 1 | 1 | 1 | 1 | 1 | -1 | -1 | 0 |
| CW16 | 1 | -1 | -1 | -1 | -1 | -1 | 1 | -1 | 0 |
| CW17 | 1 | 1 | 1 | -1 | -1 | -1 | 1 | -1 | 0 |
| CW18 | -1 | -1 | -1 | 1 | -1 | -1 | 1 | -1 | 0 |
| CW19 | -1 | 1 | 1 | 1 | -1 | -1 | 1 | -1 | 0 |
| CW20 | 1 | 1 | -1 | -1 | 1 | -1 | 1 | -1 | 0 |
| CW21 | -1 | 1 | 1 | -1 | 1 | -1 | 1 | -1 | 0 |
| CW22 | 1 | -1 | -1 | 1 | 1 | -1 | 1 | -1 | 0 |
| CW23 | -1 | -1 | 1 | 1 | 1 | -1 | 1 | -1 | 0 |
| CW24 | -1 | -1 | -1 | -1 | -1 | 1 | 1 | -1 | 0 |
| CW25 | 1 | -1 | 1 | -1 | -1 | 1 | 1 | -1 | 0 |
| CW26 | -1 | 1 | -1 | 1 | -1 | 1 | 1 | -1 | 0 |
| CW27 | 1 | 1 | 1 | 1 | -1 | 1 | 1 | -1 | 0 |
| CW28 | -1 | 1 | -1 | -1 | 1 | 1 | 1 | -1 | 0 |
| CW29 | -1 | -1 | 1 | -1 | 1 | 1 | 1 | -1 | 0 |
| CW30 | 1 | 1 | -1 | 1 | 1 | 1 | 1 | -1 | 0 |
| CW31 | 1 | -1 | 1 | 1 | 1 | 1 | 1 | -1 | 0 |

FIG. 9A

| | XI[0] | XQ[0] | YI[0] | YQ[0] | XI[1] | XQ[1] | YI[1] | YQ[1] | J[0]' J[1] |
|---|---|---|---|---|---|---|---|---|---|
| CW32 | -1 | 1 | -1 | -1 | -1 | -1 | -1 | 1 | 0 |
| CW33 | -1 | -1 | 1 | -1 | -1 | -1 | -1 | 1 | 0 |
| CW34 | 1 | 1 | -1 | 1 | -1 | -1 | -1 | 1 | 0 |
| CW35 | 1 | -1 | 1 | 1 | -1 | -1 | -1 | 1 | 0 |
| CW36 | -1 | -1 | -1 | -1 | 1 | -1 | -1 | 1 | 0 |
| CW37 | 1 | -1 | 1 | -1 | 1 | -1 | -1 | 1 | 0 |
| CW38 | -1 | 1 | -1 | 1 | 1 | -1 | -1 | 1 | 0 |
| CW39 | 1 | 1 | 1 | 1 | 1 | -1 | -1 | 1 | 0 |
| CW40 | 1 | 1 | -1 | -1 | -1 | 1 | -1 | 1 | 0 |
| CW41 | -1 | 1 | 1 | -1 | -1 | 1 | -1 | 1 | 0 |
| CW42 | 1 | -1 | -1 | 1 | -1 | 1 | -1 | 1 | 0 |
| CW43 | -1 | -1 | 1 | 1 | -1 | 1 | -1 | 1 | 0 |
| CW44 | 1 | -1 | -1 | -1 | 1 | 1 | -1 | 1 | 0 |
| CW45 | 1 | 1 | 1 | -1 | 1 | 1 | -1 | 1 | 0 |
| CW46 | -1 | -1 | -1 | 1 | 1 | 1 | -1 | 1 | 0 |
| CW47 | -1 | 1 | 1 | 1 | 1 | 1 | -1 | 1 | 0 |
| CW48 | -1 | -1 | -1 | -1 | -1 | -1 | 1 | 1 | 0 |
| CW49 | 1 | -1 | 1 | -1 | -1 | -1 | 1 | 1 | 0 |
| CW50 | -1 | 1 | -1 | 1 | -1 | -1 | 1 | 1 | 0 |
| CW51 | 1 | 1 | 1 | 1 | -1 | -1 | 1 | 1 | 0 |
| CW52 | 1 | -1 | -1 | -1 | 1 | -1 | 1 | 1 | 0 |
| CW53 | 1 | 1 | 1 | -1 | 1 | -1 | 1 | 1 | 0 |
| CW54 | -1 | -1 | -1 | 1 | 1 | -1 | 1 | 1 | 0 |
| CW55 | -1 | 1 | 1 | 1 | 1 | -1 | 1 | 1 | 0 |
| CW56 | -1 | 1 | -1 | -1 | -1 | 1 | 1 | 1 | 0 |
| CW57 | -1 | -1 | 1 | -1 | -1 | 1 | 1 | 1 | 0 |
| CW58 | 1 | 1 | -1 | 1 | -1 | 1 | 1 | 1 | 0 |
| CW59 | 1 | -1 | 1 | 1 | -1 | 1 | 1 | 1 | 0 |
| CW60 | 1 | 1 | -1 | -1 | 1 | 1 | 1 | 1 | 0 |
| CW61 | -1 | 1 | 1 | -1 | 1 | 1 | 1 | 1 | 0 |
| CW62 | 1 | -1 | -1 | 1 | 1 | 1 | 1 | 1 | 0 |
| CW63 | -1 | -1 | 1 | 1 | 1 | 1 | 1 | 1 | 0 |

FIG. 9B

FREQUENCY DOMAIN CODED MODULATION WITH POLARIZATION INTERLEAVING FOR FIBER NONLINEARITY MITIGATION IN DIGITAL SUB-CARRIER COHERENT OPTICAL COMMUNICATION SYSTEMS

RELATED APPLICATIONS

This application claims priority under 35 U.S.C. §119 to U.S. Provisional Patent Application No. 62/127,647, filed on Mar. 3, 2015, the content of which is incorporated by reference herein in its entirety. This application also claims priority under 35 U.S.C. §119 to U.S. Provisional Patent Application No. 62/154,151, filed on Apr. 29, 2015, the content of which is incorporated by reference herein in its entirety.

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal).

A WDM system may also include a receiver circuit having a receiver (Rx) PIC and an optical demultiplexer circuit (referred to as a "demultiplexer") configured to receive the combined output and demultiplex the combined output into individual optical signals. Additionally, the receiver circuit may include receiver components to convert the optical signals into electrical signals, and output the data carried by those electrical signals.

SUMMARY

According to some possible implementations, an optical transmitter may include a digital signal processor configured to receive a group of bits and encode the group of bits into first encoded data and second encoded data. The optical transmitter may include a modulator configured to modulate a phase of at least a portion of an optical signal and supply a first sub-carrier carrying a first symbol and a second sub-carrier carrying a second symbol. The first symbol and the second symbol may be based on the first encoded data and the second encoded data, respectively, such that the first sub-carrier has a first polarization state comprising first and second polarization components, and the second sub-carrier has a second polarization state comprising first and second polarization components. The first polarization state may be substantially orthogonal to the second polarization state.

According to some possible implementations, an optical receiver may include a digital signal processor configured to receive a first symbol via a first sub-carrier of an optical signal. The first sub-carrier may have a first polarization state based on first and second polarization components. The optical receiver may receive a second symbol via a second sub-carrier of the optical signal. The second symbol may have a second polarization state based on first and second polarization components. The second polarization state may be substantially orthogonal to the first polarization state. The optical receiver may decode at least the first symbol and the second symbol into a group of bits, and may output the group of bits.

According to some possible implementations, an optical system may include an optical transmitter and an optical receiver. The optical transmitter may receive and encode a first group of bits into first encoded data and second encoded data. The optical transmitter may supply a first sub-carrier carrying a first symbol and a second sub-carrier carrying a second symbol. The first symbol and the second symbol may be based on the first encoded data and the second encoded data, respectively, such that the first sub-carrier has a first polarization state comprising first and second polarization components, and the second sub-carrier has a second polarization state comprising first and second polarization components. The first polarization state may be substantially orthogonal to the second polarization state. The optical receiver may receive the first symbol via the first sub-carrier, may receive the second symbol via the second sub-carrier, may decode the first symbol and the second symbol into a second group of bits, and may output the second group of bits.

BRIEF DESCRIPTION OF THE DRAWINGS

FIGS. 1A and 1B are diagrams of an overview of an example implementation described herein;

FIG. 7 is a diagram of an example symbol map for encoding and decoding 1 bit per polarization;

FIG. 8 is a diagram of an example symbol map for encoding and decoding 1.25 bits per polarization; and FIGS. 9A and 9B are diagrams of an example symbol map for encoding and decoding 1.5 bits per polarization.

DETAILED DESCRIPTION

The following detailed description of example implementations refers to the accompanying drawings. The same reference numbers in different drawings may identify the same or similar elements.

As demand for broadband services increases, there is an increasing need for optical transceivers to deliver data over optical links at high transmission speeds (e.g., beyond 1 Terabit per second (Tb/s)). In long optical links, such as submarine links that span thousands of kilometers, fiber nonlinearity may limit the quality and/or the speed of data transmissions. Fiber nonlinearity may refer to an optical effect involving a nonlinear response to a driving light field, such as a field produced by a laser. To reduce penalties due to nonlinearities, and to permit longer optical links to be used, an optical system may employ a binary phase shift keying (BPSK) modulation scheme to modulate data at 1 bit per symbol. In some cases, multi-dimensional coding may enhance the linear and nonlinear tolerances of BPSK using multiple time slots and a quadrature phase shift keying (QPSK) symbol set. In this case, multiple dimensions of the optical field (e.g., in-phase and quadrature components, X and Y polarizations components, etc.) may be manipulated over a time domain (e.g., over multiple time slots).

As described herein, a multi-dimensional modulation scheme may be used in the frequency domain for a digital sub-carrier multiplexing system. The multi-dimensional modulation scheme may apply a polarization interleaving technique, thereby reducing the effects of fiber nonlinearity due to cross-phase modulation and cross-polarization modulation. Using multi-dimensional coding may provide a linear benefit (e.g., by providing a better noise tolerance), and using polarization interleaving may provide a nonlinear benefit (e.g., by reducing cross-phase modulation and cross-polarization modulation).

Figure 1A:
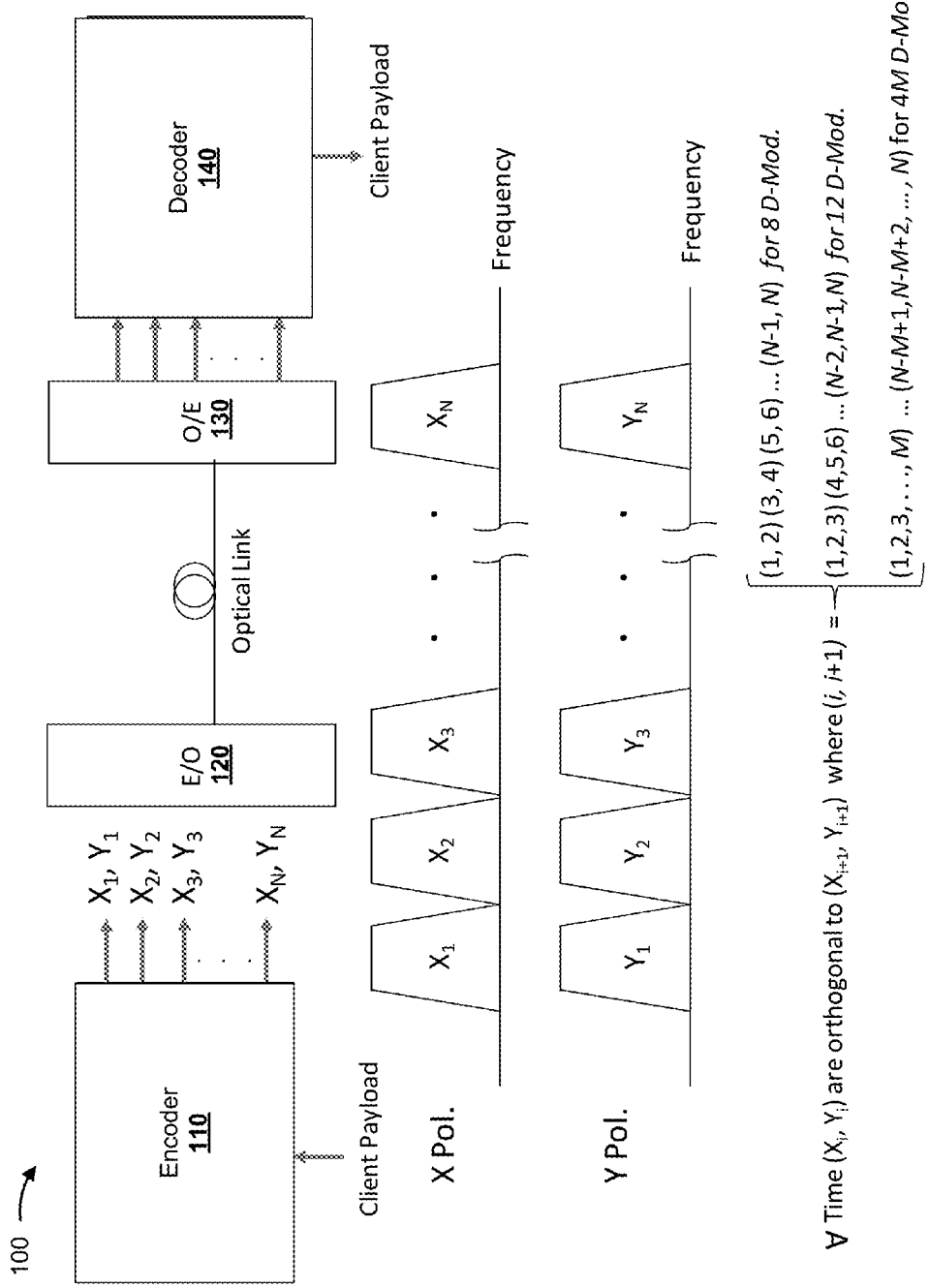

FIGS. 1A and 1B are diagrams of an overview of an example implementation 100 described herein. As shown in FIG. 1A, multiple sub-carriers (e.g., optical sub-carriers), shown as 1 through N, may be used to transmit an optical signal. As shown, different sub-carriers may carry data (e.g., symbols that represent encoded data) on different frequency bands (e.g., different portions of the radiofrequency (RF) spectrum). As shown, an encoder 110, included in an optical transmitter, may encode a client payload (e.g., to form encoded data). For example, the encoder 110 may encode the client payload into in-phase and quadrature components of X and Y polarization components of the N sub-carriers. This is shown as $X_1$, $Y_1$ for the X and Y polarization components of the first sub-carrier, $X_2$, $Y_2$ for the X and Y polarization components of the second sub-carrier, etc.

As further shown, a polarization multiplexing (PM) electrical-to-optical (E/O) converter 120 may multiplex the encoded data to generate a multiplexed optical signal, which may be transmitted via an optical link. A polarization demultiplexing optical-to-electrical (O/E) converter 130 may demultiplex the optical signal to form encoded samples at a coherent optical receiver. The optical receiver may include a decoder 140 to recover the client payload (e.g., symbols representing encoded data) from the encoded samples. Encoder 110 and decoder 140 may respectively map and de-map a quantity of incoming bits (e.g., included in the client payload) into a multi-dimensional signal set that includes, for example, in-phase and quadrature components, X and Y polarization components, and/or one or more frequency domain sub-carriers. Although not shown in FIG. 1A, E/O converter 120 and O/E converter 130 may include various optical front end devices and digital signal processors to perform various functions of coherent optical communication systems.

When encoding the client payload on the X and Y polarization components of different sub-carriers, encoder 110 may ensure that the polarization states between symbols carried via one or more pairs of adjacent sub-carriers are orthogonal. In this way, encoder 110 may significantly reduce the effect of fiber nonlinearity due to cross-phase modulation and cross-polarization modulation. Thus, encoder 110 may permit long optical links to carry data at high transmission rates with reduced nonlinear penalties. Furthermore, encoding data according to techniques described herein may increase (e.g., maximize) a Euclidean distance between pairs of modulated symbols, thereby increasing a noise tolerance of the optical system. For example, when encoding a group of 4 bits, encoder 110 may use 16 distinct transmit symbols (e.g., designated as XI[0], XQ[0], YI[0], YQ[0], XI[1], XQ[1], YI[1], and YQ[1]), which may be viewed as 8-dimensional (8D) symbols. The Euclidean distance among the 16 8D symbols may be maximized for better noise tolerance of the optical system.

Some implementations are described herein with respect to an 8-dimensional modulation scheme that utilizes two components of an optical wave (e.g., in-phase and quadrature components), two polarizations of the optical wave (e.g., X and Y polarizations), and two sub-carriers. This 8-dimensional modulation scheme permits data to be encoded using 8 different combinations of optical field elements (e.g., $XI_1$, $XQ_1$, $YI_1$, $YQ_1$, $XI_2$, $XQ_2$, $YI_2$, and $YQ_2$, where I represents an in-phase component, Q represents a quadrature component, X represents an X polarization component, Y represents a Y polarization component, a subscript of 1 represents a first sub-carrier, and a subscript of 2 represents a second sub-carrier). In some cases, techniques described herein may apply to a different quantity of dimensions, such as by applying these techniques to three sub-carriers for a 12-dimensional modulation scheme, to four sub-carriers for a 16-dimensional modulation scheme, or to M sub-carriers for a 4M-dimensional modulation scheme.

As used herein, an X polarization component may refer to a first polarization component, and a Y polarization component may refer to a second polarization component (e.g., different from the first polarization component). A polarization component may include, for example, a transverse-electric (TE) polarization component, a transverse-magnetic (TM) polarization component, an arbitrary polarization component (e.g., having an arbitrary polarization, angle, etc.) or the like. In some implementations, the X polarization and the Y polarization may be orthogonal (or substantially orthogonal) to one another. In some implementations, the X polarization and the Y polarization may not be orthogonal (or substantially orthogonal) to one another.

As shown in FIG. 1B, an optical transmitter may generate a group of sub-carriers (shown as four sub-carriers as an example) by modulating light output from a single laser. In some implementations, the optical transmitter may generate multiple groups of sub-carriers by modulating outputs from multiple corresponding lasers. In some implementations, the optical transmitter may multiplex multiple groups of sub-carriers onto a common fiber.

Figure 2:
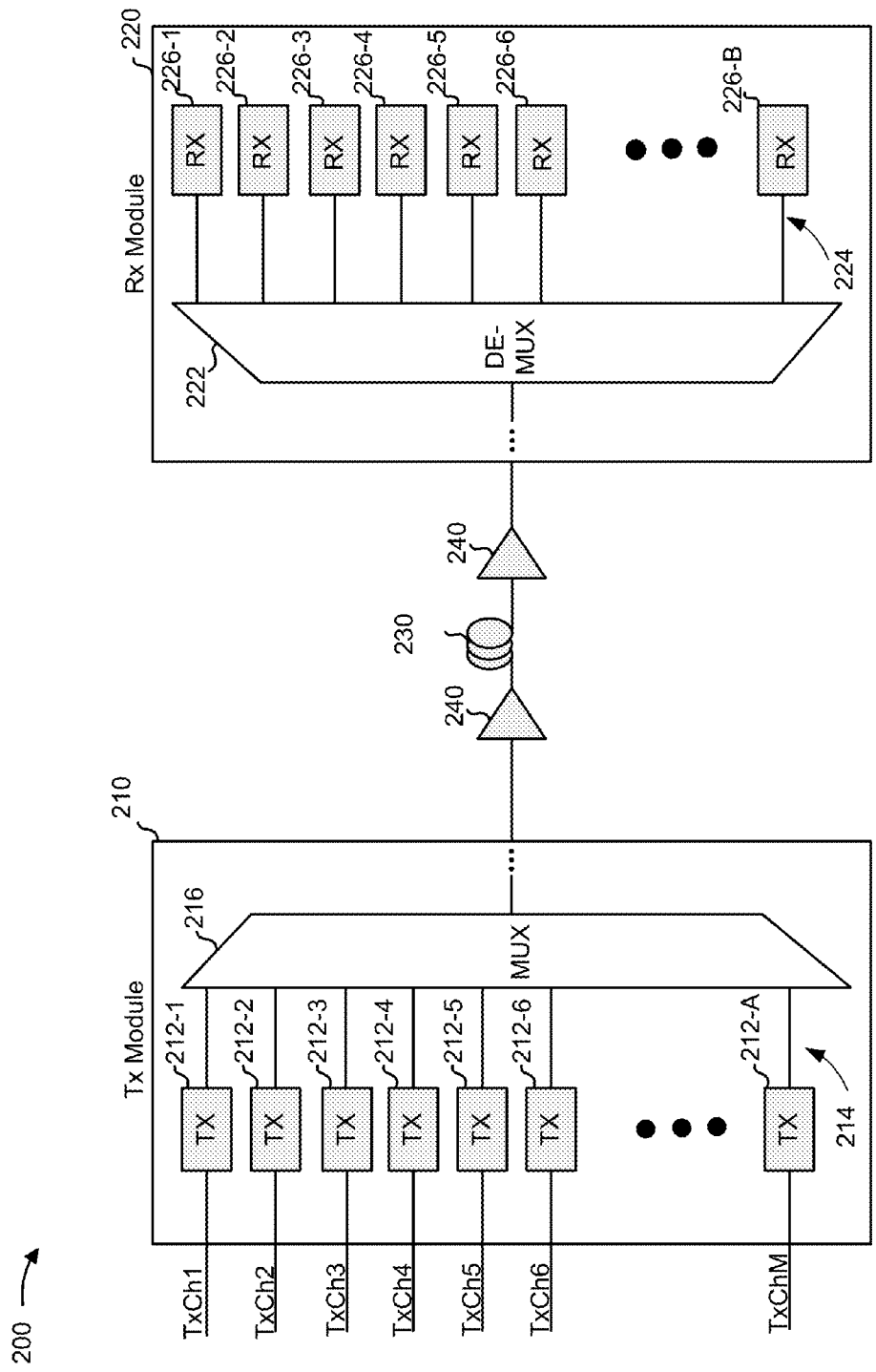
FIG. 2 is a diagram of an example network in which systems and/or methods, described herein, may be implemented.

FIG. 2 is a diagram of an example network 200 in which systems and/or methods, described herein, may be implemented. As shown in FIG. 2, network 200 may include transmitter (Tx) module 210 (e.g., a Tx PIC), and/or receiver (Rx) module 220 (e.g., an Rx PIC). In some implementations, transmitter module 210 may be optically connected to receiver module 220 via link 230. Additionally, link 230 may include one or more optical amplifiers 240 that amplify an optical signal as the optical signal is transmitted over link 230.

Transmitter module 210 may include one or more optical transmitters 212-1 through 212-A (A≥1), one or more waveguides 214, and/or an optical multiplexer 216. In some implementations, transmitter module 210 may include additional components, fewer components, different components, or differently arranged components than those shown in FIG. 2.

Optical transmitter 212 may receive data for a data channel (shown as TxCh1 through TxChM), may create multiple sub-carriers for the data channel, may map data, for the data channel, to the multiple sub-carriers, may modulate the data with an optical signal (e.g., from a laser) to create a multiple sub-carrier output optical signal, and may transmit the multiple sub-carrier output optical signal. Optical transmitter 212 may be tuned to use an optical carrier of a designated wavelength. In some implementations, the grid of wavelengths emitted by optical transmitters 212 may conform to a known standard, such as a standard published by the Telecommunication Standardization Sector (ITU-T). Additionally, or alternatively the grid of wavelengths may be flexible and tightly packed to create a super channel.

Waveguide 214 may include an optical link or some other link to transmit output optical signals of optical transmitter 212. In some implementations, an optical transmitter 212 may use one waveguide 214, or multiple waveguides 214, to transmit output optical signal(s) to optical multiplexer 216.

Optical multiplexer 216 may include an arrayed waveguide grating (AWG) or some other type of multiplexer device. In some implementations, optical multiplexer 216 may combine multiple output optical signals, associated with optical transmitters 212, into a single optical signal (e.g., a WDM signal). For example, optical multiplexer 216 may include an input (e.g., a first slab to receive input optical signals supplied by optical transmitters 212) and an output (e.g., a second slab to supply a single WDM signal associated with the input optical signals). Additionally, optical multiplexer 216 may include waveguides connected to the input and the output. In some implementations, optical multiplexer 216 may combine multiple output optical signals, associated with optical transmitters 212, in such a way as to produce a polarization diverse signal (e.g., also referred to herein as a WDM signal). As shown in FIG. 2, optical multiplexer 216 may provide the WDM signal to receiver module 220 via an optical fiber, such as link 230.

Optical multiplexer 216 may receive output optical signals outputted by optical transmitters 212, and may output one or more WDM signals. Each WDM signal may include one or more optical signals, such that each optical signal includes one or more wavelengths. In some implementations, one WDM signal may have a first polarization (e.g., a transverse magnetic (TM) polarization), and another WDM signal may have a second, substantially orthogonal polarization (e.g., a transverse electric (TE) polarization). Alternatively, both WDM signals may have the same polarization.

Link 230 may include an optical fiber. Link 230 may transport one or more optical signals associated with multiple wavelengths. Amplifier 240 may include an amplification device, such as a doped fiber amplifier, a Raman amplifier, or the like. Amplifier 240 may amplify the optical signals as the optical signals are transmitted via link 230.

Receiver module 220 may include an optical demultiplexer 222, one or more waveguides 224, and/or one or more optical receivers 226-1 through 226-B (B≥1). In some implementations, receiver module 220 may include additional components, fewer components, different components, or differently arranged components than those shown in FIG. 2.

Optical demultiplexer 222 may include an AWG or some other type of demultiplexer device. In some implementations, optical demultiplexer 222 may supply multiple optical signals based on receiving one or more optical signals, such as WDM signals, or components associated with the one or more optical signals. For example, optical demultiplexer 222 may include an input (e.g., a first slab to receive a WDM signal and/or some other input signal), and an output (e.g., a second slab to supply multiple optical signals associated with the WDM signal). Additionally, optical demultiplexer 222 may include waveguides connected to the input and the output. As shown in FIG. 2, optical demultiplexer 222 may supply optical signals to optical receivers 226 via waveguides 224.

Waveguide 224 may include an optical link or some other link to transmit optical signals, output from optical demultiplexer 222, to optical receivers 226. In some implementations, each optical receiver 226 may receive optical signals via a single waveguide 224 or via multiple waveguides 224.

Optical receiver 226 may include one or more photodetectors and/or similar devices to receive respective input optical signals outputted by optical demultiplexer 222, to detect sub-carriers associated with the input optical signals, to convert data within the sub-carriers to voltage signals, to convert the voltage signals to digital samples, and to process the digital samples to produce output data corresponding to the input optical signals. Optical receiver 226 may operate to convert an input optical signal to an electrical signal that represents the transmitted data.

The number and arrangement of components shown in FIG. 2 are provided as an example. In practice, network 200 may include additional components, fewer components, different components, or differently arranged components than those shown in FIG. 2. Additionally, or alternatively, a set of devices (e.g., one or more devices) shown in FIG. 2 may perform one or more functions described herein as being performed by another set of devices shown in FIG. 2.

Figure 3:
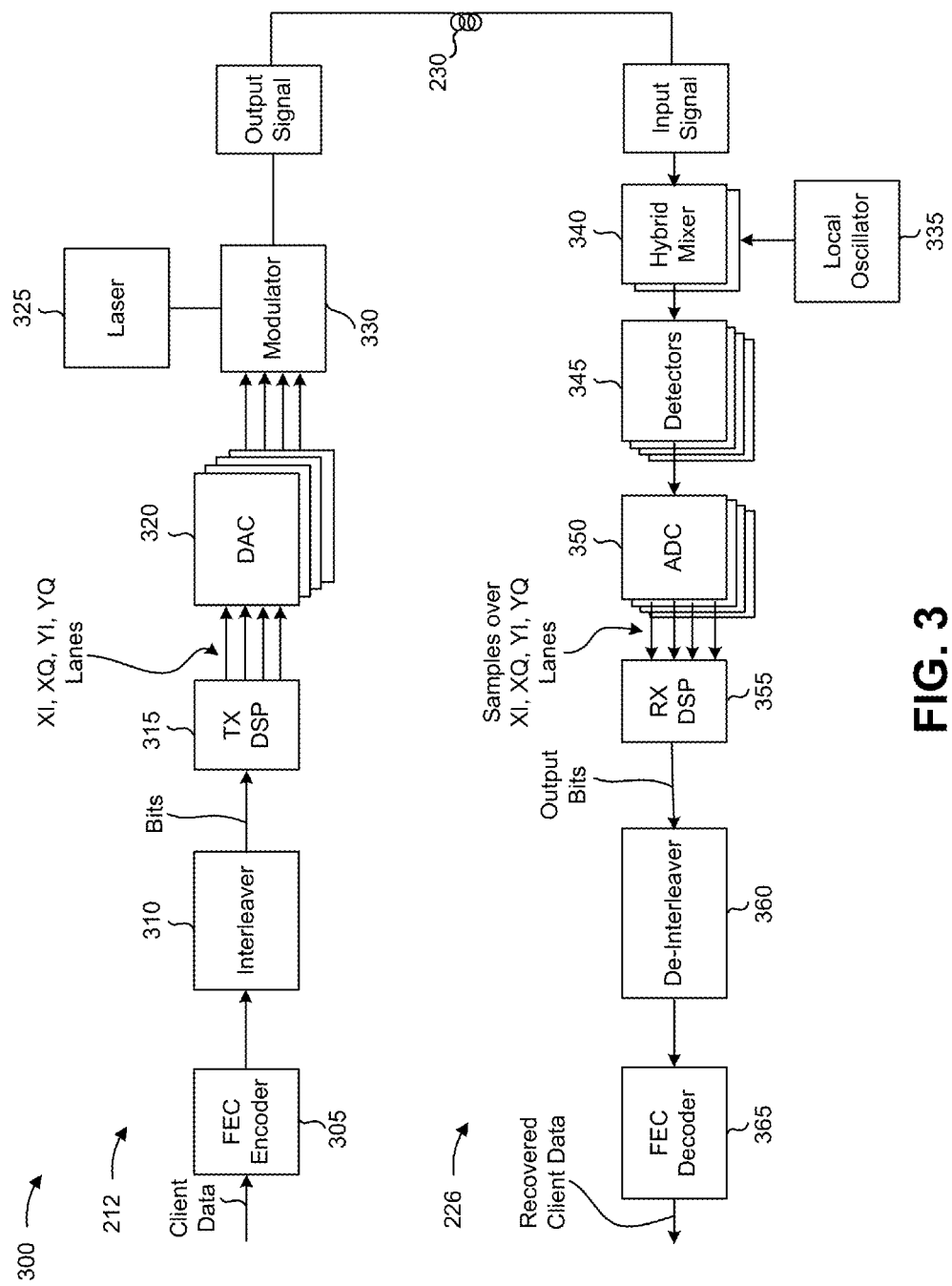
FIG. 3 is a diagram of example components of an optical transmitter and an optical receiver shown in FIG. 2.

FIG. 3 is a diagram of example components 300 of optical transmitter 212 and optical receiver 226 shown in FIG. 2. As shown in FIG. 3, optical transmitter 212 may include a forward error correction (FEC) encoder 305, an interleaver 310, a TX digital signal processor (DSP) 315, one or more digital-to-analog converters (DACs) 320, a laser 325, and/or a modulator 330. In some implementations, components of multiple optical transmitters 212 may be implemented on a single integrated circuit, such as a single PIC, to form a super-channel transmitter. As further shown in FIG. 3, optical receiver 226 may include a local oscillator 335, one or more hybrid mixers 340, one or more detectors 345, one or more analog-to-digital converters (ADCs) 350, an RX digital signal processor (DSP) 355, a de-interleaver 360, and/or a FEC decoder 365. In some implementations, local oscillator 335, hybrid mixer(s) 340, and/or detector(s) 345 may be implemented on one or more integrated circuits, such as one or more PICs. In some implementations, ADCs 350 and RX DSP 355 may be implemented using an application specific integrated circuit (ASIC).

FEC encoder 305 may include a digital encoding device or a collection of digital encoding devices. In some implementations, FEC encoder 305 may receive client data, and may encode bits, associated with the client data, to control or reduce errors in the transmission of the bits. In some implementations, FEC encoder 305 may encode the bits using a block code, a convolution code, and/or some other code or technique. As described in greater detail below, the bits may be decoded by FEC decoder 365.

Interleaver 310 may include a bit shuffling component that receives bits from FEC encoder 305 and shuffles the bits, such that, in conjunction with de-interleaver 360 in optical receiver 226, the effect may spread out and prevent multiple bits that may have errors from being grouped together. In some implementations, interleaver 310 may group the bits into groups of four bits, and may provide the grouped bits to TX DSP 315. Additionally, or alternatively, interleaver 310 may group the bits into groups of five bits, groups of six bits, or groups of another quantity of bits.

TX DSP 315 may include a digital signal processor or a collection of digital signal processors. In some implementations, TX DSP 315 may receive a signal (e.g., corresponding to grouped bits from interleaver 310), may process the signal, and may output digital signals having symbols that represent components of the signal (e.g., an in-phase X polarization (XI) component, a quadrature X polarization (XQ) component, an in-phase Y polarization (YI) component, and a quadrature Y polarization (YQ) component). For example, TX DSP 315 may encode a group of bits into encoded data (e.g., one or more of first encoded data, second encoded data, third encoded data, fourth encoded data, etc.).

In some implementations, TX DSP 315 may output the symbols across XI, XQ, YI, and YQ lanes. In some implementations, TX DSP 315 may insert a frame header prior to converting input bits to binary bits on the XI, XQ, YI, and YQ lanes of four digitally multiplexed sub-carriers. In some implementations, TX DSP 315 may digitally modulate the signal by mapping bits, associated with the signal, to the symbols. In some implementations, TX DSP 315 may digitally modulate the signal using a particular modulation format (e.g., a Binary Phase Shift Keying (BPSK) modulation format, a Quadrature Phase Shift Keying (QPSK) modulation format, or some other modulation format). In some implementations, TX DSP 315 may apply spectral shaping and/or perform filtering to the signal. Additional details regarding the operations of TX DSP 315 are described herein in connection with FIG. 4.

DACs 320 may include a signal converting device or a collection of signal converting devices. In some implementations, DACs 320 may receive respective digital signals from TX DSP 315, may convert the received digital signals to analog signals, and may provide the analog signals to modulator 330. The analog signals may correspond to electrical signals (e.g., voltages) to drive modulator 330.

Laser 325 may include a semiconductor laser, such as a distributed feedback (DFB) laser, or some other type of laser. Laser 325 may provide an optical signal to modulator 330. In some implementations, laser 325 may be an optical source for a single corresponding optical transmitter 212.

Modulator 330 may include an optical modulator, such as an electro-absorption modulator (EAM), a pair of nested Mach-Zehnder modulators (MZMs) for each polarization, or some other type of modulator. Modulator 330 may control (modulate) the intensity, amplitude, and/or phase of an optical signal (e.g., supplied by laser 325) in order to convey data associated with a data source (e.g., via one or more optical carriers of the optical signal). For example, modulator 330 may modulate the input optical signal (e.g., from laser 325) based on an input voltage signal associated with the data source (e.g., an input voltage provided by DACs 320) to form an output signal. As described below, the output signal may be provided to optical receiver 226 such that optical receiver 226 may compare the intensity, amplitude, and/or phase of the output signal to a reference signal in order to recover data carried by the output signal.

In some implementations, modulator 330 may be formed as a waveguide with electrodes for applying an electric field, based on the input voltage signal, in a direction perpendicular to the output signal output by laser 325. Alternatively, modulator 330 may be implemented based on other modulation technologies, such as electro-optic modulation. In some implementations, multiple modulators 330 may be provided to modulate signals associated with particular components. For example, a first modulator 330 may be provided to modulate an in-phase X polarization component, a second modulator 330 may be provided to modulate a quadrature X polarization component, a third modulator 330 may be provided to modulate an in-phase Y polarization component, and a fourth modulator 330 may be provided to modulate a quadrature Y polarization component.

In some implementations, modulator 330 may supply sub-carriers for carrying symbols based on encoded data. For example, modulator 330 may supply a first sub-carrier carrying a first symbol based on first encoded data, may supply a second sub-carrier carrying a second symbol based on second encoded data, may supply a third sub-carrier carrying a third symbol based on third encoded data, may supply a fourth sub-carrier carrying a fourth symbol based on fourth encoded data, etc.

As shown, modulator 330 may generate an output signal, and may provide the output signal, via link 230, as an input signal to receiver 226. For example, hybrid mixer 340 of receiver 226 may receive the input signal, as described below.

Local oscillator 335 may include a laser device or a collection of laser devices. In some implementations, local oscillator 335 may provide a reference signal to hybrid mixer 340. In some implementations, local oscillator 335 may include a single-sided laser to provide an optical signal to hybrid mixer 340. In some other implementations, local oscillator 335 may include a double-sided laser to provide multiple optical signals to multiple hybrid mixers 340. In some implementations, a phase, intensity, and/or amplitude of the reference signal may be compared to a phase, intensity, and/or amplitude of an input signal (e.g., a WDM signal supplied by optical demultiplexer 222 and corresponding to an output signal provided by transmitter module 212) to recover data carried by the input signal.

Hybrid mixer 340 may include one or more optical devices to receive an input signal (e.g., a WDM signal supplied by optical demultiplexer 222 and corresponding to an output signal provided by transmitter module 212). In some implementations, hybrid mixer 340 may receive a reference signal from local oscillator 335. In some implementations, hybrid mixer 340 may supply an output optical signal having components associated with the input signal and the reference optical signal to detectors 345. For example, hybrid mixer 340 and detectors 345 may supply an XI component, an XQ component, a YI component, and a YQ component. In some implementations, a first hybrid mixer 340 may provide the XI component and the XQ component, and a second hybrid mixer 340 may provide the YI component and the YQ component.

Detectors 345 may include one or more photodetectors, such as a photodiode, to receive an output optical signal, from hybrid mixer 340, and to convert the output optical signal to corresponding voltage signals. In some implementation, optical receiver 226 may include multiple detectors corresponding to XI components, XQ components, YI components, and YQ components. In some implementations, detectors 345 may include one or more balanced pairs of photodetectors. For example, detectors 345 may include a first pair of photodetectors to receive an XI component and a second pair of photodetectors to receive an XQ component. Additionally, or alternatively, detectors 345 may include a third pair of photodetectors to receive a YI component and a fourth pair of photodetectors to receive a YQ component.

ADC 350 may include an analog-to-digital converter that converts the voltage signals from detectors 345 to digital signals. ADC 350 may provide the digital signals to RX DSP 355. In some implementations, optical receiver 226 may include four ADCs 350 or some other number of ADCs 350 (e.g., one ADC 350 for each electrical signal output by detectors 345). In some implementations, the digital signals may include samples associated with the input signal. In some implementations, the samples may be provided to RX DSP 355 over respective XI, XQ, YI, and YQ lanes.

RX DSP 355 may include a digital signal processing device or a collection of digital signal processing devices. In some implementations, RX DSP 355 may receive digital signals from ADC 350, and may process the digital signals (e.g., to reduce phase noise, chromatic dispersion, timing skews, etc., associated with the digital signals introduced during transmission of a corresponding input signal received by hybrid mixer 340 and detectors 345) to form output bits (also referred to as "soft metrics") including data associated with the input signal. Additional details regarding RX DSP 355 are described herein in connection with FIG. 5.

De-interleaver 360 may include a bit collection component that receives output bits from RX DSP 355 (e.g., in a group of four bits, a group of five bits, a group of six bits, etc.). In some implementations, de-interleaver 360 may arrange the bits in four (FEC) frames such that first bits, of multiple groups of bits, are provided in a first frame; second bits, of the multiple groups of bits, are provided in a second frame; third bits, of the multiple groups of bits, are provided in a third frame; and fourth bits, of the multiple groups of bits, are provided in a fourth frame. In some implementations, de-interleaver 360 may group the first bits, second bits, third bits, and fourth bits from different groups to prevent bits with errors from being grouped together.

FEC decoder 365 may include a digital decoding device or a collection of digital decoding devices. In some implementations, FEC decoder 365 may receive grouped bits from de-interleaver 360, and may decode the bits using a block code, a convolution code, and/or some other code or technique. In some implementations, FEC decoder 365 may decode the bits to form recovered client data corresponding to client data provided to optical transmitter 212, as described above.

While FIG. 3 shows optical transmitter 212 as including a particular quantity and arrangement of components, in some implementations, optical transmitter 212 may include additional components, fewer components, different components, or differently arranged components. Furthermore, while FIG. 3 shows optical receiver 226 as including a particular quantity and arrangement of components, in some implementations, optical receiver 226 may include additional components, fewer components, different components, or differently arranged components. For example, optical receiver 226 may include a chromatic dispersion compensating component and/or some other component to compensate for dispersion associated with digital signals provided by ADCs 350.

Figure 4:
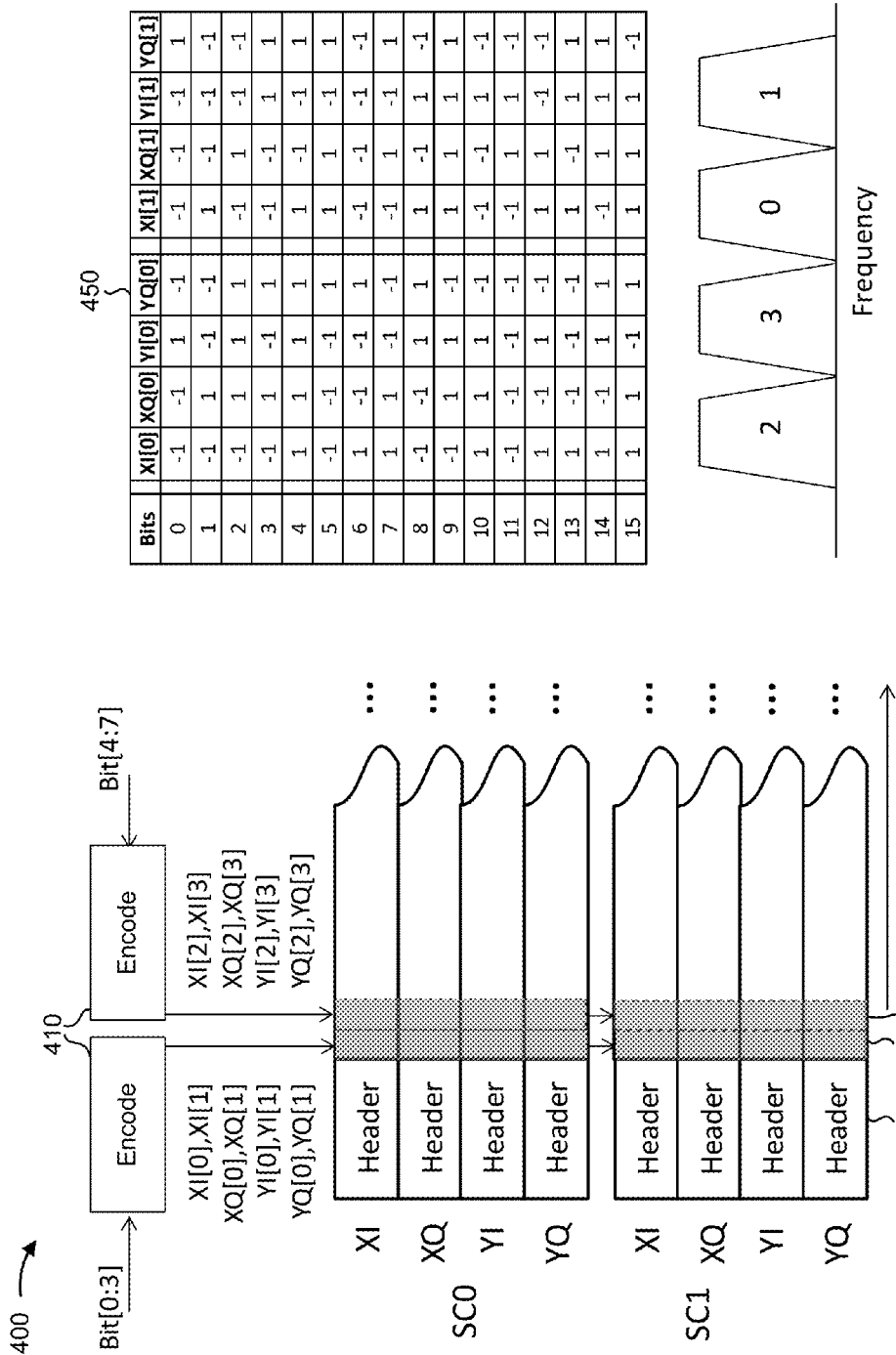
FIG. 4 is a diagram of an example of encoding a group of bits into symbols at an optical transmitter.

FIG. 4 is a diagram of an example 400 of encoding a group of bits into encoded data corresponding to symbols. As shown, TX DSP 315 may include one or more encoders 410. As shown, TX DSP 315 may insert a header 420 to define a frame (e.g., using a frame header insertion component). The bits in header 420 may be used by optical receiver 226 to identify a frame and synchronize timing. In example 400, every four bits are encoded into two symbols (e.g., first encoded data represented by a first symbol and second encoded data represented by a second symbol). TX DSP 315 may map each symbol to a same time slot on two adjacent sub-carriers. In some implementations, a different quantity of bits (e.g., five bits, six bits, etc.) may be encoded for two symbols.

For example, and as shown, a first encoder 410 may receive a first group of four bits, shown as Bit[0:3], and may map the four bits to a first output symbol of XI[0], XQ[0], YI[0], YQ[0] and a second output symbol of XI[1], XQ[1], YI[1], YQ[1]. As an example, encoder 410 may map bits to symbols as shown by symbol map 450 of FIG. 4. TX DSP 315 may transmit the first output symbol in a first time slot 430 of a first sub-carrier (shown as SC0), and may transmit the second output symbol in the first time slot 430 of a second sub-carrier (shown as SC1). In this way, both encoded symbols, which correspond to the first group of four bits, occupy the same time slot (e.g., first time slot 430) of adjacent sub-carriers (e.g., sub-carriers 0 and 1, which are adjacent to one another, as shown).

Similarly, a second encoder 410 may receive a second group of four bits, shown as Bit[4:7], and may map these four bits to a third output symbol of XI[3], XQ[3], YI[3], YQ[3] and a fourth output symbol of XI[4], XQ[4], YI[4], YQ[4]. As an example, encoder 410 may map bits to symbols as shown by symbol map 450 of FIG. 4. TX DSP 315 may transmit the third output symbol in a second time slot 440 of the first sub-carrier (shown as SC0), and may transmit the fourth output symbol in the second time slot 440 of the second sub-carrier (shown as SC1). In this way, both encoded symbols, which correspond to the second group of four bits, occupy the same time slot (e.g., second time slot 440) of adjacent sub-carriers (e.g., sub-carriers 0 and 1, which are adjacent to one another, as shown). By utilizing an encoder, optical transmitter 212 may provide a linear benefit to network 200 (e.g., by providing a better noise tolerance).

TX DSP 315 may repeat the process described above until a new header is encountered. Furthermore, TX DSP 315 may perform a similar process to encode symbols on a third sub-carrier (e.g., SC2) and a fourth sub-carrier (e.g., SC3). As described in more detail below, optical receiver 226 may identify bits in header 420, and may use the bits to determine that the first two symbols after header 420 are the first output symbol and the second output symbol, and that the next two symbols are the third output symbol and the fourth output symbol.

As described above, FIG. 4 is provided as an example. Other examples are possible and may differ from what was described in connection with FIG. 4.

Figure 5:
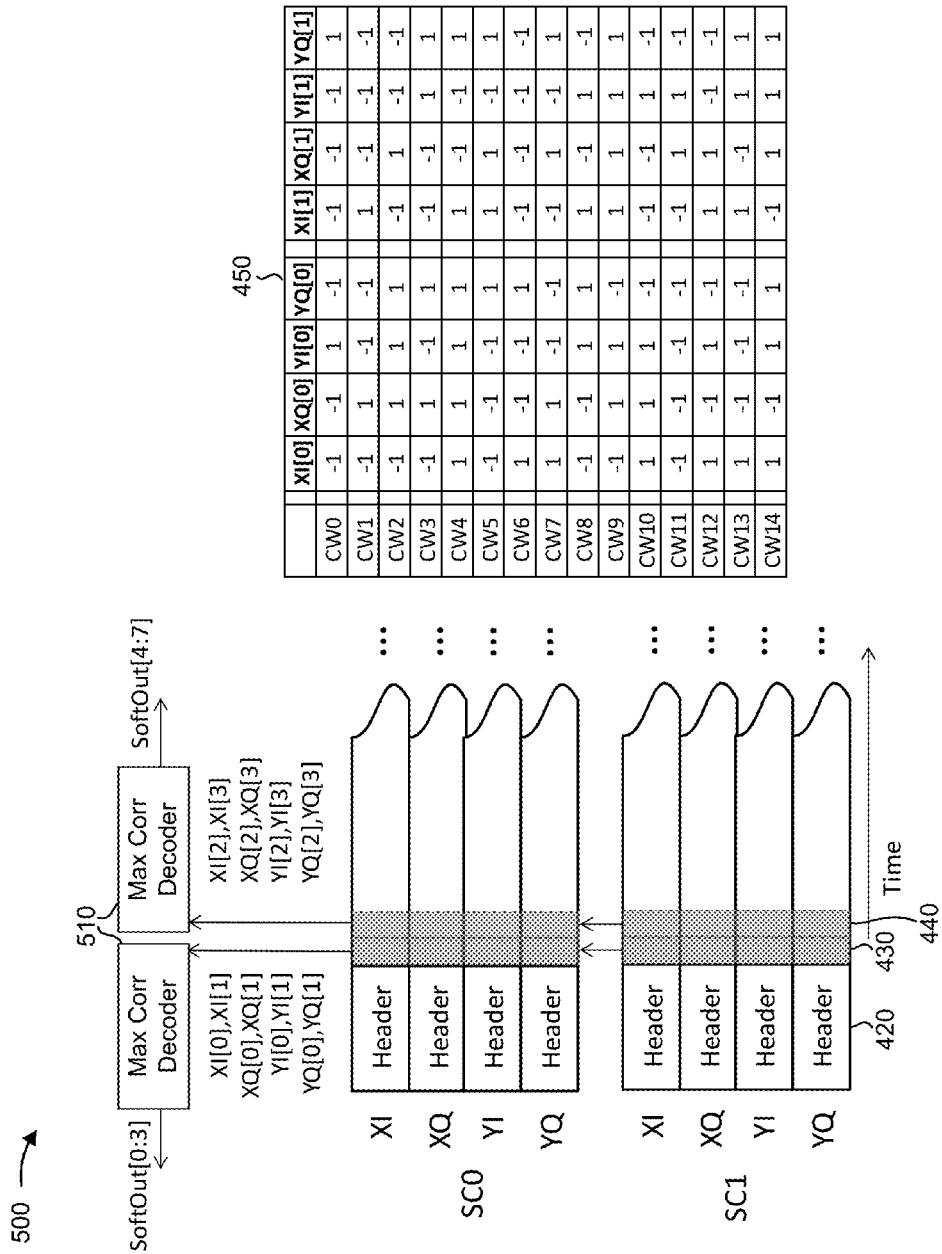
FIG. 5 is a diagram of an example of decoding symbols into a group of bits at an optical receiver.

FIG. 5 is a diagram of an example 500 of decoding symbols into bits at optical receiver 226. In some implementations, prior to decoding received symbols, optical receiver 226 (e.g., RX DSP 355) may perform RX frequency domain processing, may compensate for inter-symbol interference, may compensate for carrier-phase noise, or the like. Additionally, or alternatively, RX DSP 355 may resolve time skew between symbols received via the four lanes of a sub-carrier (e.g., XI, XQ, YI, and YQ). For example, RX DSP 355 may use header 420 to time-align symbols received via the four lanes of the sub-carrier. Additionally, or alternatively, RX DSP 355 may resolve 90-degree phase ambiguity in the QPSK constellation on the X polarization and the Y polarization. Additionally, or alternatively, RX DSP 355 may resolve 90-degree phase alignment of X polarization symbols against Y polarization symbols by, for example, using header 420. Additionally, or alternatively, RX DSP 355 may resolve 90-degree phase ambiguity across polarizations and/or across adjacent subcarriers where the joint coding has taken place, for example, using header 420.

As shown in FIG. 5, RX DSP 355 may include one or more decoders 510, such as one or more Maximum Correlation Decoders. As further shown, a first decoder 510 may obtain eight samples from a first set of received symbols. For example, the first decoder 510 may obtain four samples from a first received symbol, shown as XI[0], XQ[0], YI[0], YQ[0], and may obtain four samples from a second received symbol, shown as XI[1], XQ[1], YI[1], YQ[1]. The first received symbol and the second received symbol may be received in a same time slot (e.g., first time slot 430) of a first sub-carrier (e.g., SC0) and a second sub-carrier (e.g., SC1), respectively. The first decoder 510 may use the eight samples to calculate a first group of four soft output samples (e.g., bits), shown as SoftOut[0:3].

As further shown, a second decoder 510 may obtain eight samples from a second set of received symbols. For example, the second decoder 510 may obtain four samples from a third received symbol, shown as XI[2], XQ[2], YI[2], YQ[2], and may obtain four samples from a fourth received symbol, shown as XI[3], XQ[3], YI[3], YQ[3]. The third received symbol and the fourth received symbol may be received in a same time slot (e.g., second time slot 440) of a first sub-carrier (e.g., SC0) and a second sub-carrier (e.g., SC1), respectively. The second decoder 510 may use the eight samples to calculate a second group of four soft output samples (e.g., bits), shown as SoftOut[4:7]. By utilizing a decoder, optical receiver 226 may achieve a linear benefit in network 200 (e.g., by achieving a better noise tolerance).

In some implementations, decoder 510 may perform maximum likelihood decoding, such as by finding a minimum Euclidean distance between a received symbol and one of sixteen code words, shown in symbol map 450. Symbol map 450 may correspond to a symbol map used during encoding and decoding. Using symbol map 450 may increase (e.g., maximize) a Euclidean distance between symbols, thereby increasing noise tolerance and transmission distance. Furthermore, using symbol map 450 may permit a large phase invariance, which may reduce the number of cycle slips and phase estimation errors when used by RX DSP 355 during carrier frequency and phase recovery. During carrier phase recovery, RX DSP 355 may apply test phases to rotate a received symbol to determine the most-likely transmitted symbol. RX DSP 355 may determine which rotated sample is closest to (e.g., has the smallest Euclidean distance to) a constellation point in a constellation diagram. The Euclidean distance (ED) metric for symbol map 450 (e.g., a symbol map with 1 bit per polarization) plotted against different test phase rotations is shown in FIG. 6.

Figure 6:
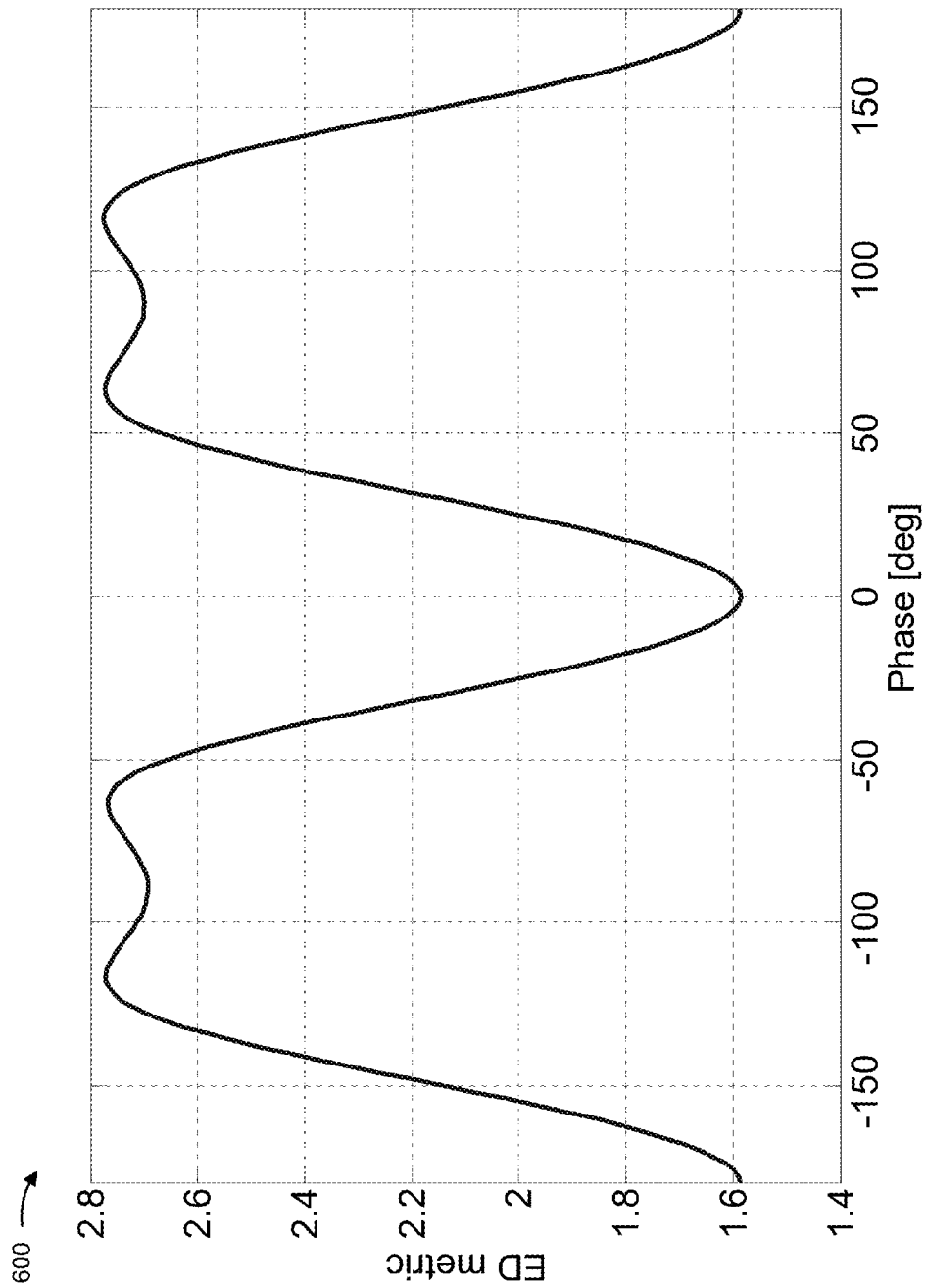
FIG. 6 is a diagram of a plot of a Euclidean distance metric, for a symbol map, against different test phase rotations of received symbols.

The ED metric shown in FIG. 6 may be a root mean square of the Euclidean distance between a sequence of code words and corresponding rotated versions of the code words with a phase angle at signal-to-noise ratio of 5 decibels (dB). The minima in the graph of FIG. 6 represent the most likely phase estimate for a received code word (e.g., a sample code word with the smallest Euclidean distance to a code word in a symbol map). As shown, the minima are separated by 180 degrees, which permits a higher tolerance for phase estimation errors and thereby significantly reduces probability of cycle slips during phase recovery inside RX DSP 355.

As indicated above, FIGS. 5 and 6 are provided as examples. Other examples are possible and may differ from what was described in connection with FIGS. 5 and 6.

FIG. 7 is a diagram of an example symbol map 700 for encoding and decoding 1 bit per polarization. In this case, four bits may be encoded over two sub-carriers (e.g., and transmitted in the same time slot), with each sub-carrier having two polarizations, resulting in 1 bit per polarization. In symbol map 700, the first code word (e.g., CW0) corresponds to a code word generated when the four bits are all zeros (e.g., 0000), the second code word (e.g., CW1) corresponds to a code word generated when the four bits are three zeros followed by a one (e.g., 0001), and so on, with the sixteenth code word (e.g., CW15) corresponding to a code word generated when the four bits are all ones (e.g., 1111).

Symbol map 700 is designed to exhibit a polarization interleaving property, where the polarizations of adjacent sub-carriers are orthogonal. By applying polarization interleaving, optical transmitter 212 may reduce the effects of fiber nonlinearity due to cross-phase modulation (XPM) and cross-polarization modulation (XPolM). Furthermore, symbol map 700 may maintain a linear benefit. While the polarizations of adjacent sub-carriers are described herein as being orthogonal, in some implementations, the polarizations may be substantially orthogonal (e.g., within a threshold angle, degree, and/or amount of orthogonality).

Two sub-carriers may be described as orthogonal if the Jones vectors of the two sub-carriers satisfy the following equation:

$$\vec{J_0}^T \vec{J_1} = conj([\begin{matrix} J_{0,x} & J_{0,y} \end{matrix}]) \begin{bmatrix} J_{1,x} \\ J_{1,y} \end{bmatrix} = 0$$

In the above expression, the term $$\vec{J_i} = \begin{bmatrix} J_{i,x} \\ J_{i,y} \end{bmatrix}$$

represents the Jones vector of sub-carrier i, with both X and Y polarization components. Furthermore, the term $\vec{J_i}^T$ represents the conjugate transpose (e.g., Hermitian transpose) of the Jones vector. The Jones vector may be represented as:

$$J_{i,x/y} = A_{x/y} e^{1i\phi_{x/y}}$$

In the above expression, the terms $A_{x/y}$ and $\phi_{x/y}$ represent the amplitude and phase of the optical field component in the X and Y polarizations, respectively. Furthermore, the term 1i represents the square root of −1 (e.g., $\sqrt{-1}$). Polarization states of a first sub-carrier and a second sub-carrier are described above as being orthogonal when the product of the Jones vector of the first sub-carrier and the conjugate transpose of the Jones vector of the second sub-carrier are equal to zero. In some implementations, the polarization states may be substantially orthogonal when the product of the Jones vector of the first sub-carrier and the conjugate transpose of the Jones vector of the second sub-carrier are equal to a number within a threshold of zero (e.g., within 0.1 of zero).

As an example, consider the first code word in symbol map 700, shown as "CW0." Assume that TX DSP 315 uses this code word when the input bits are all zeros. In this case, encoding these four bits using symbol map 700 would produce the following symbol map entry for X and Y polarizations, I and Q components, and first and second sub-carriers, as shown in the first row of symbol map 700:

$XI[0]=-1$ $XQ[0]=-1$ $YI[0]=1$ $YQ[0]=-1$ $XI[1]=-1$ $XQ[1]=-1$ $YI[1]=-1$ $YQ[1]=1$

As described above, the following complex X component and complex Y component belong to the first sub-carrier (e.g., sub-carrier 0):

$X[0]=XI[0]+\sqrt{-1}XQ[0]$ $Y[0]=YI[0]+\sqrt{-1}YQ[0]$

Similarly, the following complex X component and complex Y component belong to the second sub-carrier (e.g., sub-carrier 1):

$X[1]=XI[1]+\sqrt{-1}XQ[1]$ $Y[1]=YI[1]+\sqrt{-1}YQ[1]$

In this case, the product of the Jones vectors of the first sub-carrier and the second sub-carrier is zero, thus showing that the polarizations on the first sub-carrier and the second sub-carrier are orthogonal:

$$\vec{J_0}^\dagger \vec{J_1} = 2[\ e^{-1 iatan(-1/-1)}\quad e^{-1 iatan(1/-1)}\ ]\begin{bmatrix} e^{1 iatan(-1/-1)} \\ e^{1 iatan(1/-1)} \end{bmatrix} = 0$$

Here, a tan represents the arctangent function with a range of $(-\pi, \pi)$.

Similarly, as shown by the last column in symbol map 700 (where J[0]'J[1] represents the Hermitian inner product of the Jones vectors for sub-carrier 0 and sub-carrier 1), the Hermitian inner product of the Jones vectors for each of the other 15 code words in symbol map 700 is equal to zero. Thus, the polarizations of adjacent sub-carriers are orthogonal, thereby reducing the effects of fiber nonlinearity due to cross-phase modulation (XPM) and cross-polarization modulation (XPolM).

As shown by symbol map 700, a symbol may have an X polarization component (e.g., XI, XQ) and a Y polarization component (e.g., YI, YQ). A combination of the X polarization component for a symbol and the Y polarization component for the symbol may define a polarization state for the symbol (e.g., XI, XQ, YI, and YQ). As described above, symbols in symbol map 700 may exhibit a polarization interleaving property, whereby the polarization state of the symbols are orthogonal or substantial orthogonal.

For example, as shown by the first row of symbol map 700, a first symbol, transmitted via a first sub-carrier (e.g., sub-carrier 0), may have a first polarization state of XI[0]=-1, XQ[0]=-1, YI[0]=1, and YQ[0]=-1, and a second symbol, transmitted via a second sub-carrier (e.g., sub-carrier 1), may have a second polarization state of XI[1]=-1, XQ[1]=-1, YI[1]=-1, and YQ[1]=1. In this case, the first polarization state and the second polarization state may be orthogonal. In some implementations, the first sub-carrier and the second sub-carrier may be adjacent sub-carriers. Thus, TX DSP 315 (e.g., encoder 410) may select symbols (e.g., from a pre-defined set of symbols, a pre-defined symbol map, etc.) to maintain orthogonality (or substantial orthogonality) between polarization states of symbols transmitted in the same time slot of adjacent sub-carriers, and may encode a group of bits using the selected symbols. Additionally, or alternatively, TX DSP 315 (e.g., encoder 410) may select symbols to maximize a Euclidean distance between the symbols (e.g., while maintaining orthogonality or substantial orthogonality between polarization states).

Symbol map 700 shows a first symbol associated with a first polarization state and a first sub-carrier, as well as a second symbol associated with a second polarization state and a second sub-carrier. In some implementations, TX DSP 315 (e.g., encoder 410) may encode a group of bits using additional symbols (e.g., a third symbol, a fourth symbol, etc.) associated with additional polarization states (e.g., a third polarization state, a fourth polarization state, etc.) and additional sub-carriers (e.g., a third sub-carrier, a fourth sub-carrier, etc.). In these cases, TX DSP 315 (e.g., encoder 410) may select symbols so as to maintain orthogonality (or substantial orthogonality) between polarization states of symbols carried via adjacent sub-carriers.

As indicated above, FIG. 7 is provided as an example. Other examples are possible and may differ from what was described in connection with FIG. 7.

FIG. 8 is a diagram of an example symbol map 800 for encoding and decoding 1.25 bits per polarization. In this case, five bits may be encoded over two sub-carriers (e.g., and transmitted in the same time slot), with each sub-carrier having two polarizations, resulting in 1.25 bits per polarization. In symbol map 800, the first code word (e.g., CW0) corresponds to a code word generated when the five bits are all zeros (e.g., 00000), the second code word (e.g., CW1) corresponds to a code word generated when the five bits are four zeros followed by a one (e.g., 00001), and so on, with the thirty-second code word (e.g., CW31) corresponding to a code word generated when the five bits are all ones (e.g., 11111).

As described above in connection with FIG. 7, using symbol map 800 for encoding and decoding results in polarizations of adjacent sub-carriers being orthogonal, thereby reducing the effects of fiber nonlinearity due to cross-phase modulation (XPM) and cross-polarization modulation (XPolM). Furthermore, symbol map 800 shows a first symbol associated with a first polarization state and a first sub-carrier, as well as a second symbol associated with a second polarization state and a second sub-carrier. As described above, TX DSP 315 (e.g., encoder 410) may encode a group of bits using additional symbols (e.g., a third symbol, a fourth symbol, etc.) associated with additional polarization states (e.g., a third polarization state, a fourth polarization state, etc.) and additional sub-carriers (e.g., a third sub-carrier, a fourth sub-carrier, etc.).

As indicated above, FIG. 8 is provided as an example. Other examples are possible and may differ from what was described in connection with FIG. 8.

FIGS. 9A and 9B are diagrams of an example symbol map 900 for encoding and decoding 1.5 bits per polarization. In this case, six bits may be encoded over two sub-carriers (e.g., and transmitted in the same time slot), with each sub-carrier having two polarizations, resulting in 1.5 bits per polarization. In symbol map 900, the first code word (e.g., CW0) corresponds to a code word generated when the six bits are all zeros (e.g., 000000), the second code word (e.g., CW1) corresponds to a code word generated when the six bits are five zeros followed by a one (e.g., 000001), and so on, with the sixty-fourth code word (e.g., CW63, shown in FIG. 9B) corresponding to a code word generated when the six bits are all ones (e.g., 111111).

As described above in connection with FIG. 7, using symbol map 900 for encoding and decoding results in polarizations of adjacent sub-carriers being orthogonal, thereby reducing the effects of fiber nonlinearity due to cross-phase modulation (XPM) and cross-polarization modulation (XPolM). Furthermore, symbol map 900 shows a first symbol associated with a first polarization state and a first sub-carrier, as well as a second symbol associated with a second polarization state and a second sub-carrier. As described above, TX DSP 315 (e.g., encoder 410) may encode a group of bits using additional symbols (e.g., a third symbol, a fourth symbol, etc.) associated with additional polarization states (e.g., a third polarization state, a fourth polarization state, etc.) and additional sub-carriers (e.g., a third sub-carrier, a fourth sub-carrier, etc.).

As indicated above, FIGS. 9A and 9B are provided as an example. Other examples are possible and may differ from what was described in connection with FIGS. 9A and 9B.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical transmitter, comprising:
   a digital signal processor configured to:
      receive a group of bits;
      encode the group of bits into first encoded data and second encoded data; and
   a modulator configured to:
      modulate a phase of at least a portion of an optical signal; and
      supply a first sub-carrier carrying a first symbol and a second sub-carrier carrying a second symbol,
         the first symbol and the second symbol being based on the first encoded data and the second encoded data, respectively, such that the first sub-carrier has a first polarization state comprising first and second polarization components, and the second sub-carrier has a second polarization state comprising first and second polarization components,
            wherein the first polarization state is substantially orthogonal to the second polarization state.

2. The optical transmitter of claim 1, wherein the first symbol and the second symbol are transmitted in a same time slot of the first sub-carrier and the second sub-carrier, respectively.

3. The optical transmitter of claim 1, wherein the first sub-carrier and the second sub-carrier are adjacent sub-carriers.

4. The optical transmitter of claim 1, wherein the group of bits comprises at least four bits.

5. The optical transmitter of claim 1, wherein the first symbol and the second symbol are selected from a pre-defined set of symbols; and
   wherein the pre-defined set of symbols are configured to maximize a Euclidean distance between the pre-defined set of symbols.

6. The optical transmitter of claim 1, wherein the digital signal processor is further configured to:
   encode the group of bits into the first encoded data, the second encoded data, and third encoded data; and
   wherein the modulator is further configured to:
      supply a third sub-carrier carrying a third symbol based on the third encoded data,
         wherein the third sub-carrier has a third polarization state comprising first and second polarization components, and
         wherein the third sub-carrier is adjacent to the second sub-carrier.

7. The optical transmitter of claim 6, wherein the digital signal processor is further configured to:
   encode the group of bits into the first encoded data, the second encoded data, the third encoded data, and fourth encoded data; and
   wherein the modulator is further configured to:
      supply a fourth sub-carrier carrying a fourth symbol based on the fourth encoded data,
         wherein the fourth sub-carrier has a fourth polarization state, comprising first and second polarization components, that is substantially orthogonal to the third polarization state, and
         wherein the fourth sub-carrier is adjacent to the third sub-carrier.

8. An optical receiver, comprising:
   a digital signal processor configured to:
      receive a first symbol via a first sub-carrier of an optical signal,
         the first sub-carrier having a first polarization state based on first and second polarization components;
      receive a second symbol via a second sub-carrier of the optical signal,
         the second symbol having a second polarization state based on first and second polarization components,
         the second polarization state being substantially orthogonal to the first polarization state;
      decode at least the first symbol and the second symbol into a group of bits; and
      output the group of bits.

9. The optical receiver of claim 8, wherein the first symbol and the second symbol are selected to maintain orthogonal polarization states between the first sub-carrier and the second sub-carrier.

10. The optical receiver of claim 8, wherein the first symbol and the second symbol are selected from a pre-defined set of symbols; and
    wherein the pre-defined set of symbols are configured to maintain a maximum permissible Euclidean distance between the first symbol and the second symbol while maintaining substantial orthogonality between the first polarization state and the second polarization state.

11. The optical receiver of claim 8, wherein the first symbol and the second symbol are received in a same time slot of the first sub-carrier and the second sub-carrier, respectively.

12. The optical receiver of claim 8, wherein the first sub-carrier and the second sub-carrier are adjacent sub-carriers.

13. The optical receiver of claim 8, wherein the group of bits comprises at least four bits.

14. The optical receiver of claim 8, wherein the first sub-carrier is adjacent to the second sub-carrier; and
wherein the digital signal processor is further configured to:
receive a third symbol via a third sub-carrier of the optical signal,
the third sub-carrier having a third polarization state based on first and second polarization components;
receive a fourth symbol via a fourth sub-carrier of the optical signal,
the fourth sub-carrier being adjacent to the third sub-carrier,
the fourth sub-carrier having a fourth polarization based on first and second polarization components, and
the fourth polarization state being substantially orthogonal to the third polarization state; and
decode at least the first symbol, the second symbol, the third symbol, and the fourth symbol into the group of bits.

15. An optical system, comprising:
an optical transmitter configured to:
receive a first group of bits;
encode the first group of bits into at least first encoded data and second encoded data;
supply a first sub-carrier carrying a first symbol and a second sub-carrier carrying a second symbol,
the first symbol and the second symbol being based on the first encoded data and the second encoded data, respectively, such that the first sub-carrier has a first polarization state comprising first and second polarization components, and the second sub-carrier has a second polarization state comprising first and second polarization components,
wherein the first polarization state is substantially orthogonal to the second polarization state; and
an optical receiver configured to:
receive the first symbol via the first sub-carrier;
receive the second symbol via the second sub-carrier;
decode at least the first symbol and the second symbol into a second group of bits; and
output the second group of bits.

16. The optical system of claim 15, wherein the optical transmitter is further configured to:
select the first symbol and the second symbol to maintain orthogonal polarization states between the first sub-carrier and the second sub-carrier.

17. The optical system of claim 15, wherein the optical transmitter is further configured to:
select the first symbol and the second symbol based on a symbol map,
wherein the symbol map is chosen to maximize a Euclidean distance between a pre-defined set of symbols included in the symbol map.

18. The optical system of claim 15, wherein the first symbol and the second symbol are transmitted and received in a same time slot associated with the first sub-carrier and the second sub-carrier, respectively.

19. The optical system of claim 15, wherein the first sub-carrier and the second sub-carrier are adjacent sub-carriers.

20. The optical system of claim 15, wherein the group of bits includes four or more bits.

* * * * *